United States Patent Office 2,793,086
Patented May 21, 1957

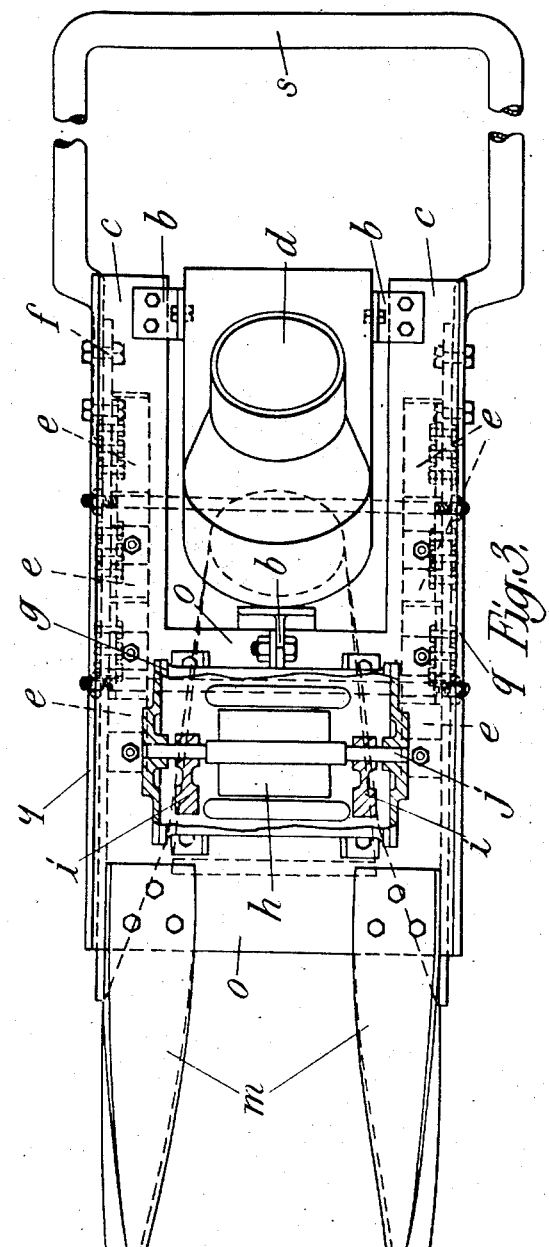

2,793,086

PNEUMATIC COLLECTING AND CONVEYING DEVICES

Fred Raby Jolley, Cheadle Heath, Stockport, England, assignor to Simon Handling Engineers Limited, Stockport, England, a British company Application June 28, 1954, Serial No. 439,811

Claims priority, application Great Britain July 20, 1953

10 Claims. (Cl. 302—58)

This invention relates to pneumatic collecting and conveying means. In removing certain materials by suction nozzles from the floors of ships, storage receptacles and the like, it is usually necessary to employ ploughs or other mechanical devices or heavy manual labour to trim the material and cause it to flow to the suction nozzles of the pneumatic conveying system.

The object of the present invention is to provide efficient and reliable means which enables the nozzle unit itself to perform the necessary trimming operation.

The invention consists in pneumatic elevating and conveying means comprising a suction nozzle mounted in a structure which has members which ride upon the floor, the said structure being automatically propelled in a direction to move the nozzle into the material to be elevated and conveyed by a power driven vibrator upon the structure connected to the members which ride upon the floor by angularly disposed spring blades.

The invention further comprises pneumatic elevating and conveying means as aforesaid in which the vibrator comprises an electric motor having excentrically disposed weights upon its shaft.

The invention further comprises pneumatic elevating and conveying means as aforesaid in which the nozzle and motor are mounted on a platform down through which the nozzle projects, which is carried by the angularly disposed spring blades, the upper ends of which, where they are secured to the platform, are in advance of the lower ends where they are secured to the members which ride upon the floor.

The invention further comprises pneumatic elevating and conveying means as aforesaid in which the nozzle is of trumpet shape with a flared mouth and with a circular end where it is coupled up to the suction system.

The invention further comprises pneumatic elevating and conveying means as aforesaid in which a cross member through which the nozzle mouth projects prevents in conjunction with the members which ride upon the floor, the flow of material beyond the nozzle into the structure as the nozzle and structure advance into the material.

The invention further comprises pneumatic elevating and conveying means as aforesaid in which parts secured to the structure project in advance of the nozzle to agitate the bulk material into which the nozzle is travelling.

Figure 1:
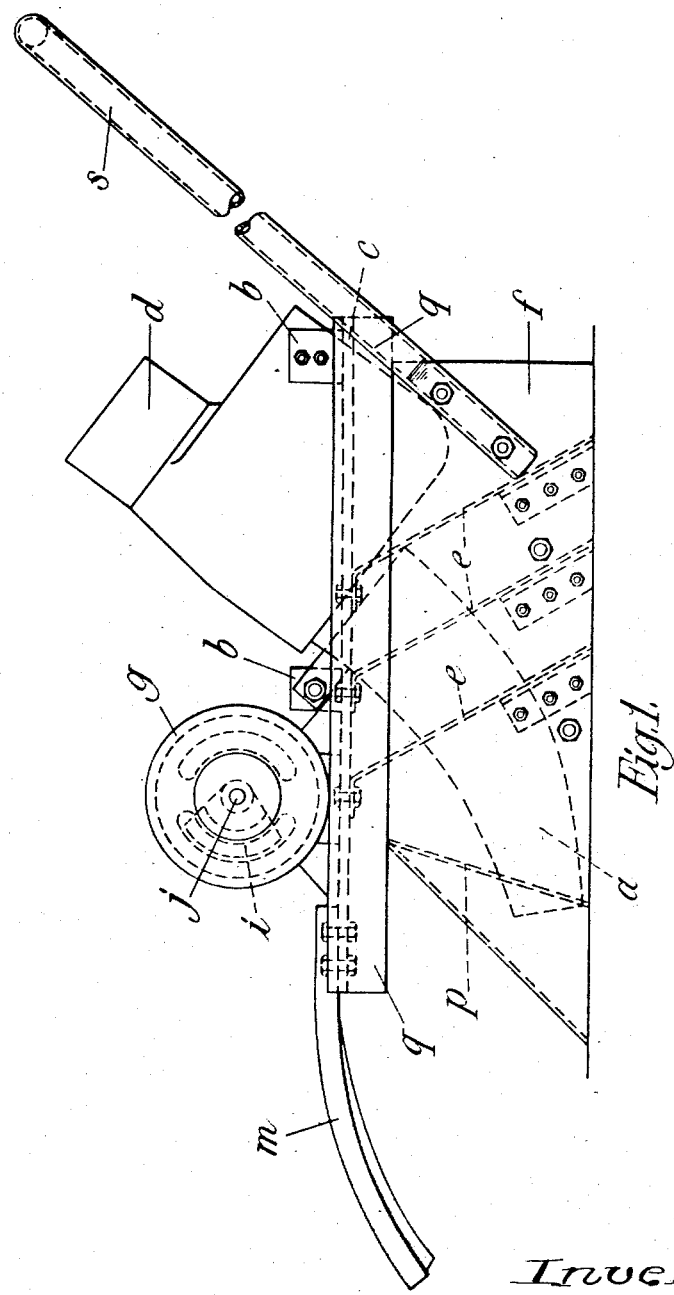
Figure 2:
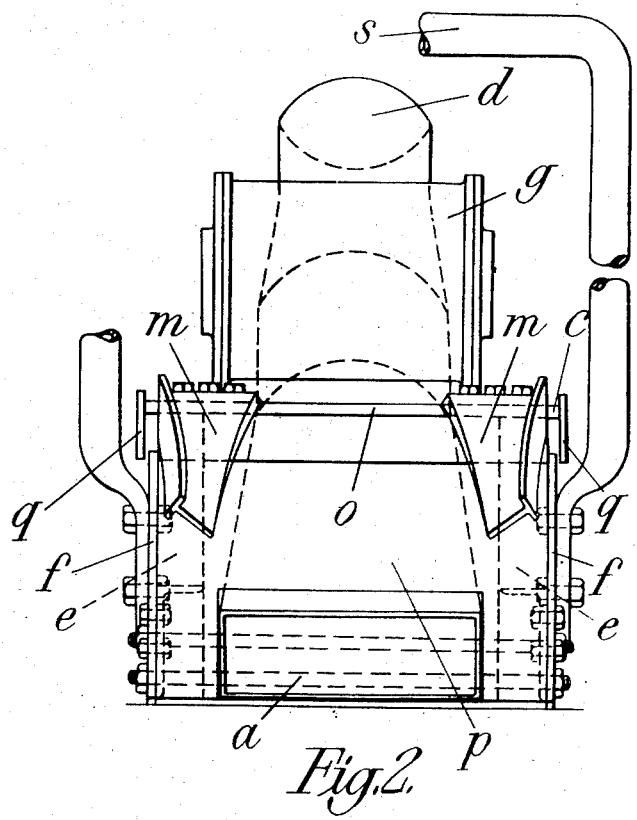

Referring to the accompanying explanatory drawings:
Figure 1 is a side elevation, Figure 2 an end view looking from left to right in Figure 1 and Figure 3 a plan view with the vibrator partly in section showing one form of my improved pneumatic elevating and conveying means.

The suction nozzle $a$ is carried upon brackets $b$ upon platforms $c$ between which the nozzle projects downwardly. The nozzle shown is of trumpet shape with a flared mouth. It is of circular form at $d$ where it is to be coupled up to the suction main. The platforms are supported by blade springs $e$ from side plates $f$ which project in advance of the nozzle $a$. Parts $m$ which project in advance of the nozzle opening act as agitators for the bulk material. Upon a cross memebr $o$ extending between and integral with the platforms $c$ is mounted a vibrator unit $g$ which comprises as shown diagrammatically an electric motor $h$ with excentric weights $i$ on its shaft $j$. The blade springs $e$ are set at an angle to the vertical (which may for example be 45°), the upper ends of the springs being in advance of the lower ends so that as the platform vibrates, the nozzle $a$ and the complete structure in which it is mounted is propelled forward along the floor or other base and into the material which is to be passed into and conveyed away by the nozzle.

A cross plate $p$ closes in the space above and around the front of the nozzle to prevent material passing beyond the nozzle into the advancing structure. Side plates $q$ close in the space between the platform $c$ and the tops of the plates $f$.

The speed of the vibrator unit can be suitably adjusted to suit the rate of advance required for the nozzle having regard to the material being dealt with.

In practice, an ordinary suction nozzle or one made as described in my concurrent U. S. A. application No. 427,193 of 1954 may be used for dealing with the bulk of the material, after which my improved self propelling nozzle is attached to the suction pipe and travels into the material to complete its discharge.

The self propelling nozzle has a long handle or the like $s$ projecting to the rear thereof by which the operator controls the direction of advancing movement of the nozzle.

I may use any convenient form of vibrator unit on the nozzle platform.

With my improvement, the suction nozzle advances automatically at a controllable rate into the material to be collected and elevated, and so avoids the necessity of hand labour for trimming the material. The direction of advance of the nozzle is under the control of the operator.

What I claim is:

1. In the art of pneumatically picking up and conveying bulk material a portable combined pick-up suction nozzle and propelling structure adapted to move along a surface to pick up and remove material therefrom comprising a frame structure, a pick-up nozzle carried thereby and including an intake end depending therefrom and directed forwardly as regards the direction of movement, said nozzle having a coupling end adapted for connection with a source of suction, surface engaging foot members depending beneath said frame, leaf spring means connected between said foot members and said frame and providing a resilient interconnection and a power operated vibrator carried by said frame for imparting vibrations thereto which are transmitted through the resilient interconnection to the foot members to thereby propel the interconnected nozzle carrying frame and foot members along the surface relative to bulk material to pick up the same.

2. A portable combined pick-up suction nozzle and propelling structure as claimed in claim 1 and including handle means connected to the foot members facilitating manual guidance of the structure.

3. A portable combined pick-up suction nozzle and propelling structure as claimed in claim 1 in which the plane of each leaf spring is perpendicular to the axis of the nozzle and said springs being inclined upwardly and forwardly as regards the direction of movement of the frame.

4. A portable combined pick-up suction nozzle and propelling structure as claimed in claim 1 in which the power operated vibrator comprises an electric motor including a shaft and eccentrically disposed weight means carried by the shaft.

5. A portable combined pick-up suction nozzle and propelling structure as claimed in claim 1 in which the frame includes a platform having opposite sides and an opening therein, said nozzle extending downwardly through the opening with its intake end forwardly thereof, said power operated vibrator comprising an electric motor driven vibrator carried on said platform forwardly of the opening, said foot members comprising at least two members spaced transversely of the platform and underlying the same and said leaf spring means comprising a series of leaf springs arranged along the opposite sides of the platform, the plane of each leaf spring being perpendicular to the axis of the nozzle, each spring including an upper and a lower end, a connection between the upper end and the platform and a connection between the lower end and a foot member which as regards the direction of movement of the platform lies rearwardly of the first connection whereby all leaf springs are inclined upwardly and forwardly.

6. A portable combined pick-up suction nozzle and propelling structure as claimed in claim 5 and a plate member secured between the foot members and surrounding the intake end of the nozzle for preventing the flow of material into the space between the foot members as the structure advances along the surface into the material.

7. A portable combined pick-up suction nozzle and propelling structure as claimed in claim 1 in which the nozzle is trumpet shaped with the intake end flared and the coupling end circular.

8. A portable combined pick-up suction nozzle and propelling structure as claimed in claim 1 in which material disturbing finger means are secured to the frame and extend forwardly thereof to agitate piled bulk material as the structure advances thereinto.

9. In the art of handling bulk material a self propelled pick-up nozzle structure comprising in combination spaced surface engaging means, a supporting frame, a pick-up nozzle carried thereby and adapted for connection to a source of suction resilient means interconnecting the frame and the surface engaging means and vibration imparting means carried by the frame for imparting vibrations thereto and thus through the resilient means to impart movements including a forward component of movement to the surface engaging means to propel the structure along a surface whereby the nozzle can pick up bulk material.

10. A self-propelled structure for manipulating a suction nozzle relative to bulk material lying on a surface, said structure comprising a platform, vibration imparting means carried thereby, bulk material agitating finger means carried by the platform and extending forwardly thereof, spaced surface engaging means disposed beneath the platform and upwardly and forwardly inclined leaf springs connected between each surface engaging means and the platform whereby vibrations imparted to the frame are transmitted through said springs to said surface engaging means to impart movements thereto including a forward component of movement so that the structure moves along a surface.

References Cited in the file of this patent

UNITED STATES PATENTS

| 1,570,806 | Walling | Jan. 26, 1926 |
| 2,167,985 | Levay | Aug. 1, 1939 |
| 2,639,777 | Dull | May 26, 1953 |

FOREIGN PATENTS

| 365,766 | Germany | Dec. 21, 1922 |
| 820,573 | Germany | Nov. 12, 1951 |
| 413,490 | Italy | Apr. 30, 1946 |